United States Patent
Maeurer et al.

(10) Patent No.: US 7,083,114 B2
(45) Date of Patent: Aug. 1, 2006

(54) FUEL INJECTOR

(75) Inventors: Walter Maeurer, Korntal-Muenchingen (DE); Ulrich Doebler, Remseck (DE); Hubert Stier, Vaihingen/Enz (DE); Guenther Hohl, Stuttgart (DE); Rene Deponte, Weil Im Schoenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 221 days.

(21) Appl. No.: 10/474,088

(22) PCT Filed: Nov. 26, 2002

(86) PCT No.: PCT/DE02/04335

§ 371 (c)(1),
(2), (4) Date: Apr. 1, 2004

(87) PCT Pub. No.: WO03/067071

PCT Pub. Date: Aug. 14, 2003

(65) Prior Publication Data

US 2004/0164175 A1    Aug. 26, 2004

(30) Foreign Application Priority Data

Feb. 5, 2002    (DE) ................ 102 04 655

(51) Int. Cl.
- *B05B 1/08* (2006.01)
- *B05B 3/04* (2006.01)
- *B05B 1/30* (2006.01)
- *F02M 59/00* (2006.01)

(52) U.S. Cl. ............... 239/102.2; 239/88; 239/533.2; 239/533.9; 239/585.1; 239/585.3; 239/585.4; 239/585.5

(58) Field of Classification Search ............ 239/102.2, 239/88–93, 533.2, 533.9, 533.12, 585.1, 239/585.3, 585.4, 585.5; 251/129.15, 129.21, 251/127
See application file for complete search history.

(56) References Cited

U.S. PATENT DOCUMENTS

| | | | | |
|---|---|---|---|---|
| 5,544,816 A | * | 8/1996 | Nally et al. ............... | 239/585.5 |
| 5,921,475 A | * | 7/1999 | DeVriese et al. ......... | 239/585.4 |
| 5,944,262 A | * | 8/1999 | Akutagawa et al. ...... | 239/585.4 |
| 5,996,911 A | * | 12/1999 | Gesk et al. ............... | 239/585.1 |
| 6,328,232 B1 | * | 12/2001 | Haltiner, Jr. et al. .... | 239/585.1 |

FOREIGN PATENT DOCUMENTS

| | | |
|---|---|---|
| DE | 195 34 445 | 3/1997 |
| DE | 199 12 665 | 9/2000 |
| DE | 100 07 733 | 8/2001 |
| EP | 0 869 278 | 10/1998 |
| EP | 1 079 098 | 2/2001 |
| WO | WO 00/57050 | 9/2000 |

* cited by examiner

*Primary Examiner*—Davis Hwu
(74) *Attorney, Agent, or Firm*—Kenyon & Kenyon LLP

(57) ABSTRACT

A fuel injector for the direct injection of fuel into the combustion chamber of an internal combustion engine includes an actuator, which is encapsulated in a first sleeve and is sealed from an inner chamber of the fuel injector; a valve needle actuable by the actuator, which includes a valve-closure member cooperating with a valve-seat surface to form a sealing seat; and a locking spring, by which the valve needle is acted upon in such a manner that the valve-closure member is held in sealing contact at the valve-seat surface. An inflow-side end face of the first sleeve is dimensioned such that a linear deformation of the first sleeve, caused by the fuel pressure present at the inflow-side end face, is compensated by a linear deformation of the actuator and an activating piston extending the actuator.

15 Claims, 2 Drawing Sheets

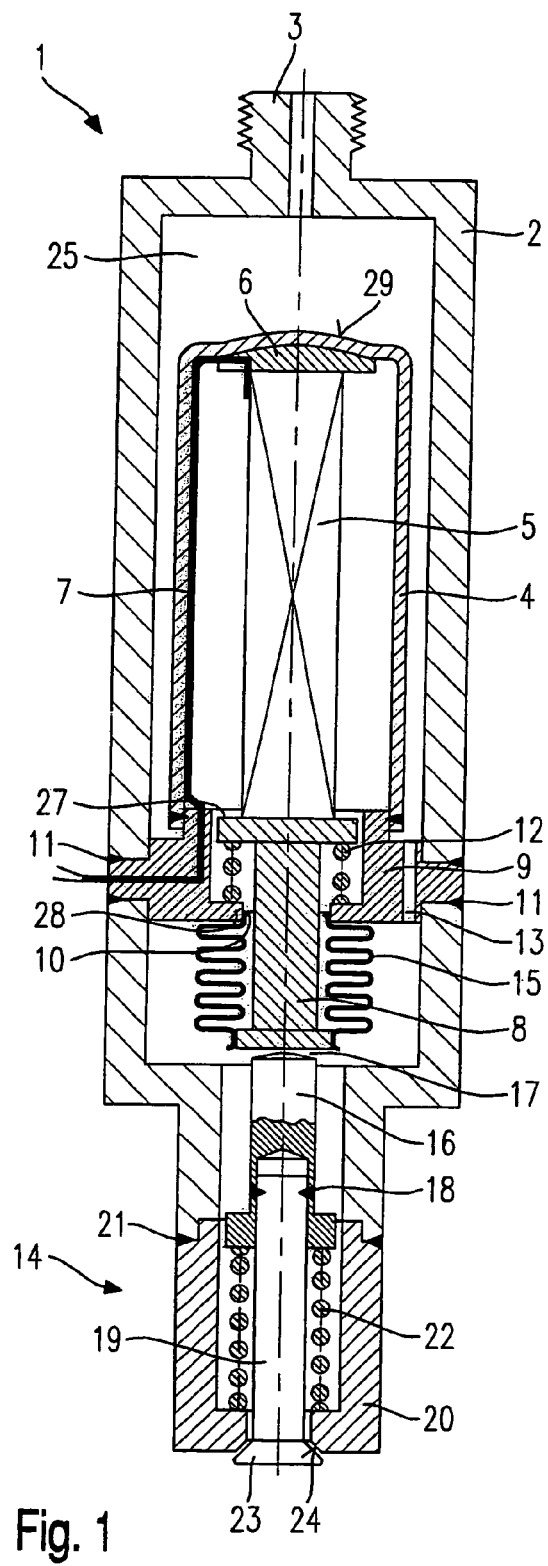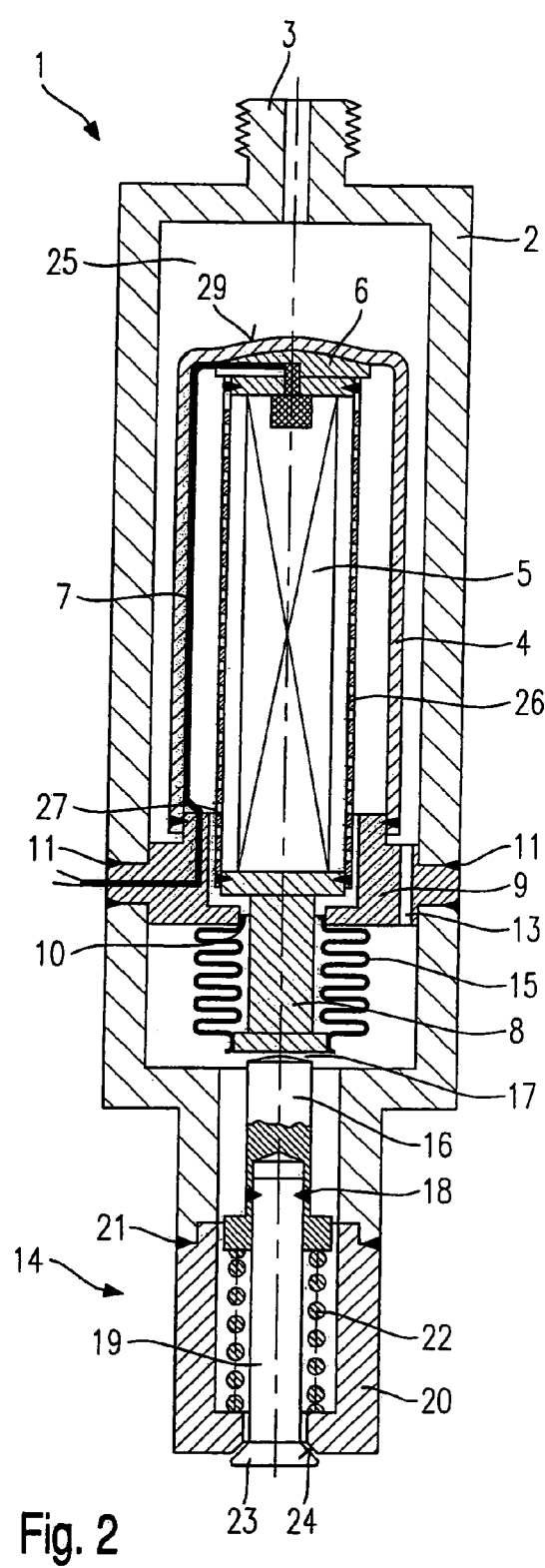

FUEL INJECTOR

FIELD OF THE INVENTION

The present invention is directed to a fuel injector.

BACKGROUND INFORMATION

A fuel injector is described in German Patent Application No. DE 195 34 445. The fuel injector for internal combustion engines described therein includes a nozzle needle, which is axially movable in a nozzle body and can be actuated by a piezoelectric actuator and which is held in a closing position by a compression spring. The fuel is supplied by an external source at a freely adjustable pressure. The nozzle needle has a central bore, and the actuator, which concentrically surrounds the nozzle needle, is sealed from the fuel pressure by a sealing surface.

A particular disadvantage of the fuel injector described in German Patent Application DE 195 34 445 is that, due to the influence of the fuel pressure, the lift of the piezoactuator can vary by up to 30% of the nominal lift, the sealing surfaces notwithstanding.

Furthermore, it is disadvantageous that, due to the length of the valve needle, oscillations are induced therein, which can lead to uncontrollable bouncing.

SUMMARY

An example embodiment of a fuel injector according to the present invention may have the advantage that the dependence of the valve lift on the fuel pressure is substantially reduced by pressure-compensating measures. Compressive oscillations and actuator oscillations are decoupled. This is made possible by a sleeve in which the actuator is encapsulated, the stiffness of the sleeve and the actuating piston being selected such that a linear deformation of the sleeve is compensated by a corresponding linear deformation of the actuator and the actuating piston, which is disposed on the downstream side of the actuator.

It may be advantageous, in particular, if the actuator is prestressed in a simple manner by a spring, which is clamped between an actuating piston that is in operative connection with the actuator, and a sleeve that is joined to the housing of the fuel injector.

Furthermore, it may be advantageous if a prestressing of the actuator is accomplished via a spring sleeve, which prestresses the two end faces of the actuator against each other via a support component and a shoulder of the actuating piston.

Due to the stationary arrangement of the second sleeve on the housing of the fuel injector, oscillations caused by the fuel pressure are effectively damped.

The stiffness of the various materials of the bellows and the sleeve of the actuator are in this case selected in such a way that the linear deformations are compensated.

In an advantageous manner, the first sleeve may also be encapsulated in a tube so as to avoid transverse forces, which make the longitudinal compensation more difficult, and be sealed by a seal, so that only the end face is acted on by a force, but not the side surface of the sleeve encapsulating the actuator. This simplifies the compensation of the linear deformation.

BRIEF DESCRIPTION OF THE DRAWINGS

Exemplary embodiments of the present invention are shown in simplified form in the drawings and are elucidated in greater detail in the following description.

FIG. 1 shows a schematic section through a first exemplary embodiment of a fuel injector configured according to the present invention.

FIG. 2 shows a schematic section through a second exemplary embodiment of a fuel injector configured according to the present invention.

DETAILED DESCRIPTION OF EXAMPLE EMBODIMENTS

Figure 3:
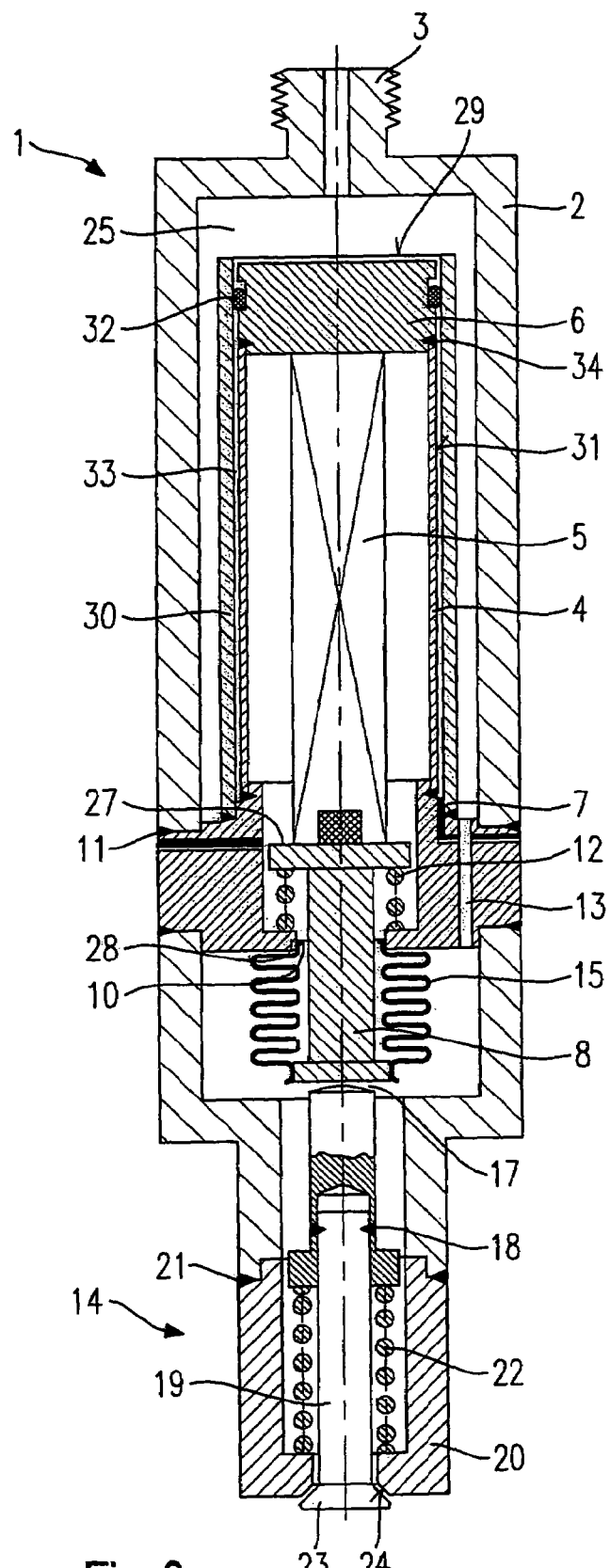
FIG. 3 shows a schematic section through a third exemplary embodiment of a fuel injector configured according to the present invention.

A first exemplary embodiment of a fuel injector 1 according to the present invention, shown in FIG. 1, is configured in the form of a fuel injector 1 for fuel-injection systems of mixture-compressing internal combustion engines having externally supplied ignition. Fuel injector 1 is particularly suited for the direct injection of fuel into a combustion chamber (not shown) of an internal combustion engine.

Fuel injector 1 encompasses a housing 2, which includes an hydraulic connection 3 for the supply of fuel. Arranged inside housing 2 is a first sleeve 4 in which an actuator 5 is encapsulated. In the first exemplary embodiment, actuator 5 is designed as piezoelectric actuator 5. On the inflow side, actuator 5 is braced on first sleeve 4 via a support component 6. Also guided in first sleeve 4 is an electrical line 7 for contacting actuator 5.

On the downstream side, actuator 5 is braced on an actuating piston 8, which penetrates a second sleeve 9 through an opening 10. Second sleeve 9 seals first sleeve 4 from the fuel and is joined to housing 2 in form-locking manner via welded seams 11. Disposed between a shoulder 28 of sleeve 9 and a shoulder 27 of actuating piston 8 is a spring 12, which prestresses actuator 5.

Formed in second sleeve 9 is at least one fuel channel 13, which allows the fuel to pass through to a valve group 14. Actuator 5 and actuating piston 8 are sealed from the fuel by means of a bellows 15 having an elastic design.

Formed on the downstream side of actuating piston 8 is a flange 16, which, in the closed state of fuel injector 1, is set apart from actuating piston 8 by a gap 17. Flange 16 is in force-locking connection with a valve needle 19 via a welded seam 18. Valve needle 19 is guided in a nozzle body 20, nozzle body 20 being connected to housing 2 by a welded seam 21. Disposed between flange 16 and nozzle body 20 is a locking spring 22. Locking spring 22 acts on flange 16, and thus valve needle 19, with a closing force that keeps fuel injector 1 closed in the non-energized state of actuator 5. In this way, a valve-closure member 23, which is connected to valve needle 19, is held in sealing contact at a valve-seat surface 24 formed on nozzle body 20.

In response to an excitation of actuator 5, it expands in a discharge direction of the fuel, counter to the force of spring 12, thereby causing actuating piston 8 to move in the discharge direction of the fuel as well. Gap 17 between actuating piston 8 and valve needle 19 is closed. When actuator 5 expands further, valve needle 19 is moved counter to the force of locking spring 22, in the discharge direction of the fuel, too. This causes valve-closure member 23 to lift off from valve-seat surface 24, and fuel is injected into the combustion chamber (not shown further) of the internal combustion engine.

Actuator 5 contracts when the electric current supplied via electrical line 7 to energize actuator 5 is switched off. In response to valve needle 19 being relieved by actuating piston 8, locking spring 22 moves flange 16 counter to the flow direction of the fuel, so that valve-closure member 23, which is joined to valve needle 19, sets down on valve-seat surface 24 once again, thereby closing fuel injector 1. The force of spring 12 also moves actuating piston 8, counter to the flow direction of the fuel as well, so that actuating piston 8 returns to its original position. Gap 17 is formed once more between actuating piston 8 and valve needle 19.

Due to the fuel pressure in an inner chamber 25 of fuel injector 1, first sleeve 4 in which actuator 5 is encapsulated is compressed. In this way, support component 6, which abuts against actuator 5 on the inflow side, is pushed in the discharge direction of the fuel, thereby compressing actuator 5 as well. Without compensating measures, this would have the result that gap 17, formed between actuating piston 8 and valve needle 19, enlarges to an impermissible extent. Therefore, the stiffness of first sleeve 4 and the stiffness of actuating piston 8 are designed such that a linear deformation of first sleeve 4 in response to the fuel pressure is compensated by a linear deformation of actuator 5 and actuating piston 8, so that the totality of all linear deformations adds up to zero and is thus unable to affect the lift of valve needle 19. In this context, $\Sigma\Delta l=0$, linear deformation $\Delta l$ being proportional to the acting force, so that $\Delta l=F/c$. In this context, c denotes the stiffness of the acted upon material in response to the pressure force. Thus, in terms of the actual amount, $$F_{sleeve}/c_{sleeve}=F_{actuator/piston}/c_{actuator/piston}.$$

On the condition that the diameter of fuel channel 13 is dimensioned such that the fuel flows in an unthrottled manner in the direction of the sealing seat, the pressure difference on the inflow side and on the discharge side of second sleeve 9 is zero as well, so that, with $F=p.A$, it holds $$F_{sleeve}/c_{sleeve}=F_{actuator/piston}/c_{actuator/piston}.$$

Since $c_{sleeve}>>c_{bellows}$, with the further restriction of the equation to the pressure relevant surfaces, the following results overall:

$$A_{sleeve}-A_{bellows}/c_{sleeve}=A_{bellows}/c_{actuator/piston}.$$

The areas $A_{sleeve}$ and $A_{bellows}$ and the stiffnesses $c_{sleeve}$ and $c_{actuator/piston}$ may now be adapted in a simple manner by a corresponding form and material selection, in such a way that first sleeve 4 encapsulating actuator 5 is pressure-compensated in connection with bellows 15.

Actuating piston 8 actuates valve needle 19 only when an electric voltage is supplied to actuator 5 via electrical line 7. The compressional oscillations of the fuel and oscillations of actuator 5 are decoupled by this measure, so that no undesired opening pulses occur. Therefore, it is possible to dispense with other, more complicated pressure-compensation technologies, such as an hydraulic coupler. Furthermore, gap 17 is dimensioned such that temperature-related linear deformations of the actuator cannot lead to malfunctions of fuel injector 1.

In a part-sectional view, FIG. 2 shows a second exemplary embodiment of a fuel injector 1 configured according to the present invention. Identical components have been given the same reference numerals. A description of already described components is not provided. In particular, valve group 14 may be identical to valve group 14 described in FIG. 1.

The second exemplary embodiment shown in FIG. 2 is an especially simple variant of fuel injector 1 according to the present invention. Actuator 5 has an additional spring sleeve 26 in sleeve 4, which acts like a tension spring. In this way, actuator 5 is prestressed and also provided with an initial stress already prior to its actuation. An additional spring, as in the first exemplary embodiment, may be omitted. In all other respects, the functioning method is identical to that of the exemplary embodiment described in FIG. 1.

In a schematic sectional view, FIG. 3 shows a third exemplary embodiment of a fuel injector 1 configured according to the present invention. Identical components have been provided with identical reference numerals. A description of already described components is dispensed with. In particular, valve group 14 may be identical to valve group 14 described in FIG. 1.

In the exemplary embodiments shown in FIGS. 1 and 2, due to the force of the fuel that flows through fuel injector 1 and does not act exclusively on the inflow-side end face 29 of first sleeve 4, a lengthening of first sleeve 4 by transverse forces cannot be avoided, this lengthening counteracting the compression of first sleeve 4 and making it more difficult to compensate for the linear deformation.

In order circumvent this, the exemplary embodiment shown in FIG. 3 proposes to encapsulate first sleeve 4 in a tube 30. While end face 29 of first sleeve 4 still absorbs the force acting thereon, a side surface 31 of first sleeve 4 is shielded, however, in that a seal 32 is inserted between tube 30 and support component 6. Seal 32 may be designed in the form of an O-ring, for example.

As a result, a chamber 33 that is free of forces is formed between first sleeve 4, which in the present third exemplary embodiment is joined to support component 6 in a simple manner via a welded seam 34, and tube 30, this chamber 33 preventing a lengthening of first sleeve 4, thereby facilitating the compensation of linear deformations.

The present invention is not restricted to the exemplary embodiments shown, but also applicable, for instance, to inwardly opening fuel injectors 1 or magnetostrictive actuators 5.

What is claimed is:

1. A fuel injector for direct injection of fuel into a combustion chamber of an internal combustion engine, comprising:
    a first sleeve;
    an actuator encapsulated in the first sleeve and sealed from an inner chamber of the fuel injector;
    a valve needle actuable by the actuator, the valve needle including a valve-closure member cooperating with a valve-seat surface to form a sealing seat;
    a locking spring by which the valve needle is acted upon in such a manner that the valve-closure member, in a non-energized state of the actuator, is held in sealing contact at the valve-seat surface; and
    an activating piston, wherein after a gap between the activating piston and the valve needle is closed, the actuator actuates the valve needle via the activating piston;
    wherein a stiffness of the first sleeve and a stiffness of the activating piston is dimensioned such that a linear deformation of the first sleeve, caused by a fuel pressure applied on an inflow-side end face of the first sleeve, is compensated by a linear deformation of the actuator and of the activating piston, in such a way that an axial breadth of the gap does not change in response to a change in the fuel pressure.

2. The fuel, injector as recited in claim 1, further comprising:
a support component which abuts against the first sleeve, the actuator being braced on the inflow side on the support component.

3. The fuel injector as recited in claim 1, further comprising:
a second sleeve through which the activating piston penetrates via an opening;
wherein the actuator is in operative connection with the activating piston.

4. The fuel injector as recited in claim 3, wherein the second sleeve is joined to the first sleeve and a housing of the fuel injector via welded seams.

5. The fuel injector as recited in claim 3, further comprising:
a bellows joined to the second sleeve, the bellows configured to seal the activating piston from the inner chamber of the fuel injector.

6. The fuel injector as recited in claim 5, wherein the stiffness of the first sleeve is substantially greater than a stiffness of the bellows.

7. The fuel injector as recited in claim 1, further comprising:
a spring configured to apply an initial stress to the actuator.

8. The fuel injector as recited in claim 7, wherein the spring is disposed on a downstream side of the actuator.

9. The fuel injector as recited in claim 8 wherein the spring is clamped between a shoulder of the activating piston and a shoulder of a second sleeve.

10. The fuel injector as recited in claim 1, further comprising:
a spring sleeve, the actuator being provided with an initial stress by the spring sleeve.

11. The fuel injector as recited in claim 10, wherein the spring sleeve is connected by force locking to a shoulder of the activating piston on one side and to a support component, which abuts against the first sleeve and on which the actuator is braced, on the other side.

12. The fuel injector as recited in claim 10, further comprising:
a tube, the first sleeve being encapsulated in the tube in such a way that a force exerted by the fuel acts only on the inflow-side end face of the first sleeve.

13. The fuel injector as recited in claim 12, further comprising:
a seal, the first sleeve being sealed from the inner chamber of the fuel injector by the seal.

14. The fuel injector as recited in claim 13, wherein the seal is an O-ring.

15. The fuel injector as recited in claim 12, wherein a chamber that is free of forces is between the tube and the first sleeve.

* * * * *